(12) United States Patent  (10) Patent No.: US 8,209,079 B2
Nakane  (45) Date of Patent: Jun. 26, 2012

(54) ELECTRIC POWER STEERING SYSTEM AND CONTROL METHOD THEREFOR

(75) Inventor: Naoki Nakane, Toyota (JP)

(73) Assignee: Denso Corporation, Kariya (JP)

( * ) Notice: Subject to any disclaimer, the term of this patent is extended or adjusted under 35 U.S.C. 154(b) by 588 days.

(21) Appl. No.: 12/485,391

(22) Filed: Jun. 16, 2009

(65) Prior Publication Data

US 2009/0319117 A1   Dec. 24, 2009

(30) Foreign Application Priority Data

Jun. 19, 2008 (JP) ................................ 2008-160783

(51) Int. Cl.
*G06F 19/00* (2011.01)
*B62D 5/04* (2006.01)
*G01R 15/20* (2006.01)
*B62D 5/00* (2006.01)

(52) U.S. Cl. .................... 701/29.8; 701/29.1; 701/29.2; 701/29.7; 701/32.8; 701/33.7

(58) Field of Classification Search ................. 180/6.24, 180/6.44, 6.48, 6.58; 701/29.1, 29.2, 29.7–29.9, 701/31.7, 32.8, 33.7–33.9, 36, 41–44, 49
See application file for complete search history.

(56) References Cited

U.S. PATENT DOCUMENTS

| | | | |
|---|---|---|---|
| 5,811,695 A * | 9/1998 | Satoh et al. | 73/862.331 |
| 2005/0171667 A1 * | 8/2005 | Morita | 701/43 |
| 2005/0264248 A1 * | 12/2005 | Tsunoda | 318/434 |
| 2006/0107763 A1 * | 5/2006 | Paek | 73/862.193 |
| 2006/0117870 A1 | 6/2006 | Tokumoto et al. | |
| 2007/0074589 A1 * | 4/2007 | Harata et al. | 73/862.335 |
| 2010/0082200 A1 * | 4/2010 | Ura | 701/34 |

FOREIGN PATENT DOCUMENTS

| | | |
|---|---|---|
| JP | 5-69851 | 3/1993 |
| JP | 6-102112 | 4/1994 |
| JP | 9-58505 | 3/1997 |
| JP | 11-078924 | 3/1999 |
| JP | 2000-128003 | 5/2000 |
| JP | 2002-255054 | 9/2002 |
| JP | 2003-312507 | 11/2003 |
| JP | 2004-196128 | 7/2004 |

(Continued)

OTHER PUBLICATIONS

Japanese Office Action dated Apr. 27, 2010, issued in corresponding Japanese Application No. 2008-160783, with English translation.

*Primary Examiner* — Khoi Tran
*Assistant Examiner* — Dale Moyer
(74) *Attorney, Agent, or Firm* — Nixon & Vanderhye PC

(57) ABSTRACT

An electric power steering system of a vehicle has a plurality of Hall ICs for sensing torque applied to a steering wheel, and an electric motor for power-assisting the steering wheel. A supply voltage for the Hall ICs is varied temporarily to check the electric output signals of the Hall ICs. A non-failing device of the plurality of Hall ICs, which generates the electric output signal varying in response to the variation of the supply voltage, is selected. The electric motor is controlled based on only the electric output signal of the non-failing device.

8 Claims, 4 Drawing Sheets

FOREIGN PATENT DOCUMENTS

| | | |
|---|---|---|
| JP | 2004-224077 | 8/2004 |
| JP | 2005-193834 | 7/2005 |
| JP | 2005-271860 | 10/2005 |
| JP | 2005-289190 | 10/2005 |
| JP | 2006-162272 | 6/2006 |
| JP | 2006-248354 | 9/2006 |
| JP | 2007-091069 | 4/2007 |
| JP | 2007-283891 | 11/2007 |

* cited by examiner

ELECTRIC POWER STEERING SYSTEM AND CONTROL METHOD THEREFOR

CROSS REFERENCE TO RELATED APPLICATION

This application is based on and incorporates herein by reference Japanese Patent Application No. 2008-160783 filed on Jun. 19, 2008.

FIELD OF THE INVENTION

The present invention relates to an electric power steering system (EPS) and control method, which power-assist steering operation of a steering wheel by an electric motor.

BACKGROUND OF THE INVENTION

In conventional electric power steering systems, operation of an electric motor is controlled in accordance with torque applied to a steering wheel of a vehicle by a driver. Specifically, the torque is detected by a torque sensor assembled in a steering shaft of the steering wheel, for example, and outputted to an electronic control unit (ECU). The ECU controls the operation of the electric motor in accordance with a detected torque.

The EPS is mounted recently not only in light-weight vehicles but also in normal passenger vehicles. The number of vehicles in which steering operation of a steering wheel is power-assisted by the EPS is remarkably increasing. If the EPS fails to power-assist the steering operation, the load to the driver in steering the steering wheel suddenly changes. To counter this problem, various controls are proposed.

According to EPS of the following patent documents 1 to 7, even when a failure arises in the EPS, the power-assisting operation of the EPS is not stopped entirely but the electric motor is continued to be operated based on a control method, which is predetermined to avoid that the load to the driver in steering the steering wheel changes suddenly.

Since the controls proposed in the patent documents 1 to 7 are primarily for avoiding the sudden change in the steering load by the continuation of the power-assisting operation as an emergency measure. The assisting power in this instance is limited to a rather low assisting-power. Thus, it is necessary to gradually reduce the assisting power until it becomes null. It is required therefore to avoid stopping of the power-assisting operation by maintaining the assisting power, even when the EPS fails.

Patent document 1: JP 9-58505 A
Patent document 2: JP 2002-255054 A
Patent document 3: JP 2005-193834 A
Patent document 4: JP 2004-196128 A
Patent document 5: JP 2005-271860 A
Patent document 6: JP 2005-289190 A
Patent document 7: JP 2007-283891 A

SUMMARY OF THE INVENTION

It is therefore an object of the present invention to ensure power-assisting operation without lowering assisting power even at time of failure of an EPS.

According to the present invention, an electric power steering system of a vehicle has a plurality of sensing parts and an electric motor Each of the sensing parts is operable to sense torque applied to a steering wheel and generates an electric output signal varying with both a supply voltage and a sensed torque. The supply voltage supplied to the plurality of sensing parts is varied for a predetermined time, and it is checked whether the electric output signal of each of the plurality of sensing parts varies in response to a temporary variation of the supply voltage. A non-failing device, which generates the electric output signal varying in response to the variation of the supply voltage, is selected from the plurality of sensing parts. The electric motor is controlled based on only the electric output signal of the non-failing device.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

An electric power steering system (EPS) according to a first embodiment is described in detail with reference to the figures.

Figure 1:
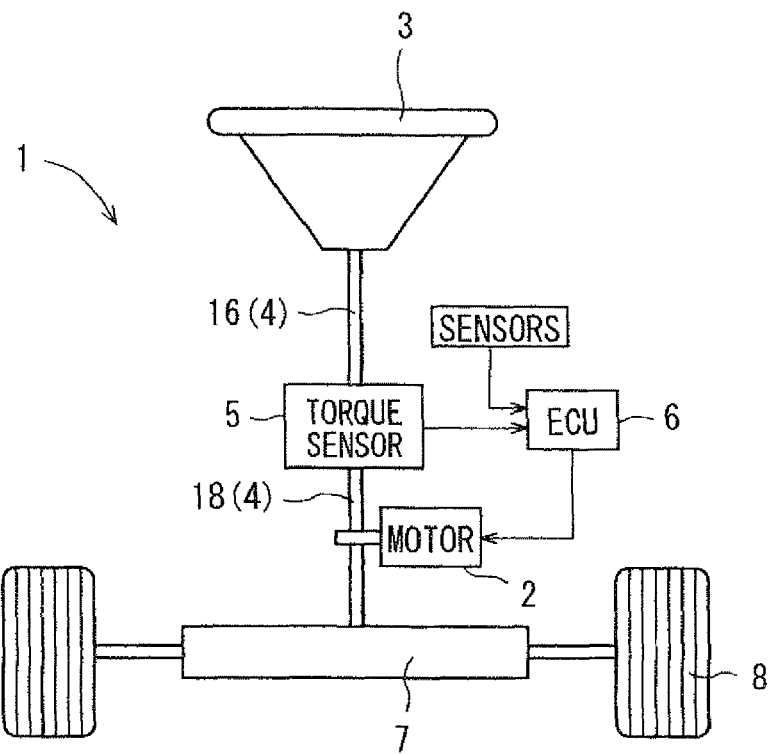
FIG. 1 is a schematic view of an electric power steering system according to a first embodiment of the present invention.

As shown in FIG. 1, an EPS 1 is for power-assisting steering operation of a steering wheel 3 by output power of an electric motor 2. The electric motor 3 is controlled in accordance with a torque, which a driver of a vehicle applies to the steering wheel 3. This torque is detected by a torque sensor 5, which is assembled for example in a steering shaft 4, and outputted to an electronic control unit (ECU) 6 so that the ECU 6 controls the operation of the electric motor 2 in accordance with the detected torque.

The EPS 1 is thus provided with the electric motor 2 for generating the output power to power-assist the steering operation of the steering wheel 3, the torque sensor 5 for generating an electric output signal corresponding to the torque applied to the steering wheel 3, and the ECU 6 for controlling the operation of the electric motor 2 based on the electric output signal generated by the torque sensor 5.

The torque applied to the steering wheel 3 is transferred to steered wheels (tire wheels) 8 through the steering shaft 4, a rack and pinion mechanism 7 and the like so that the steered wheels 8 are steered. The output power of the electric motor 2 is transferred to the rack and pinion mechanism 7, for example, so that steering of the steered wheels 8, that is, steering by the steering wheel 3, is power-assisted by the electric motor 2. The electric motor 2 may be any one of a variety of types of motors, which include a direct current (DC) motor, a brushless DC motor, a switched reluctance motor, a magnet-embedded synchronous motor and the like.

Figure 2:
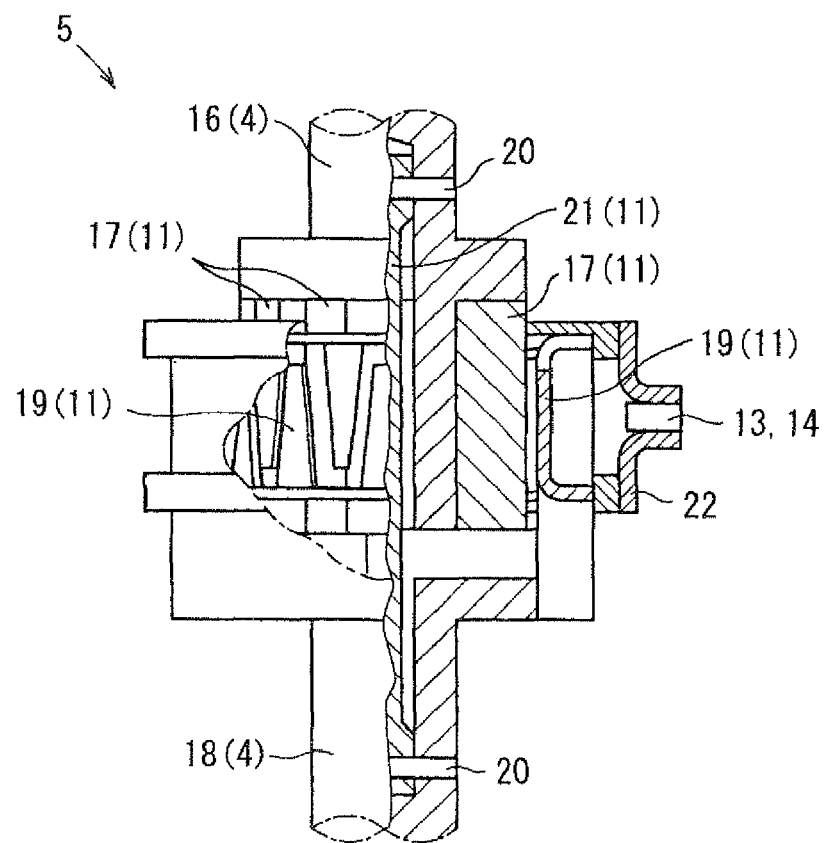
FIG. 2 is a partial cross sectional view of a torque sensor used in the first embodiment.
Figure 3:
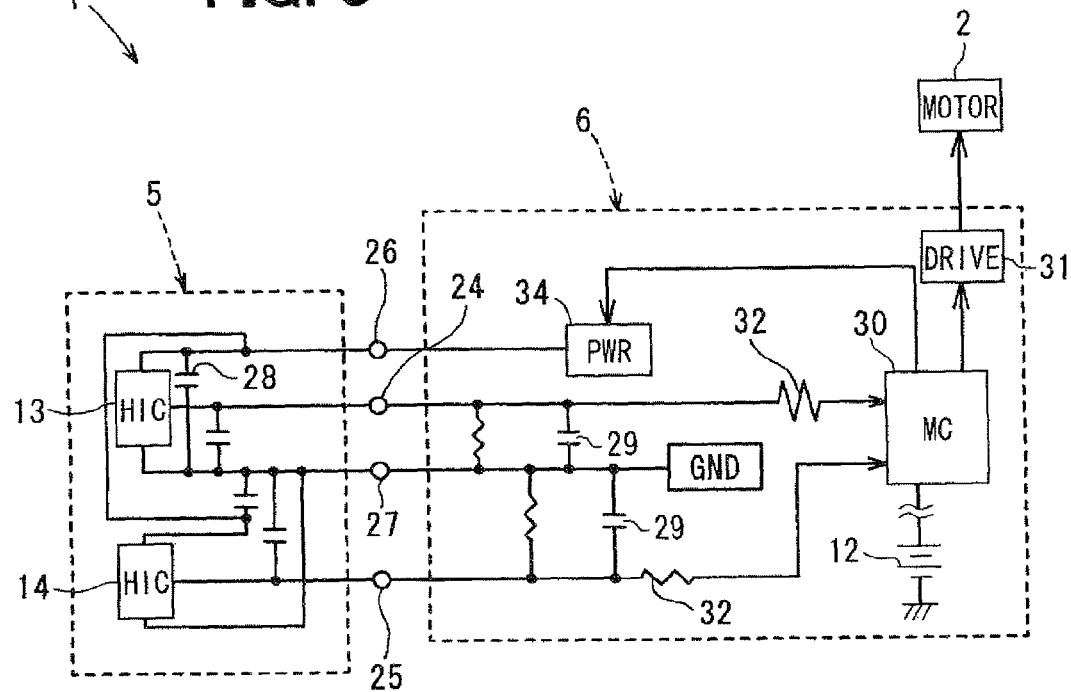
FIG. 3 is an electric circuit diagram of an ECU used in the first embodiment.

The torque sensor 5 has, as shown in FIGS. 2 and 3, a magnetic flux generating part 11 and two output parts 13 and 14. The magnetic flux generating part 11 generates magnetic flux varying with the steering operation of the steering wheel 3. The output generating parts 13 and 14 generate respective electric output signals corresponding to the magnetic flux generated by the magnetic flux generating part 11 and a supply voltage supplied from an electric power source 12.

The magnetic flux generating part 11 is configured by permanent magnets 17 a comb-shaped yoke 19, a torsion bar 21 and the like. The magnets 17 are rotatable integrally with an input shaft 16 (steering shaft 4), which is on the side of the steering wheel 3. The comb-shaped yoke 19 is rotatable integrally with an output shaft 18 (steering shaft 4), which is on the side of the steered wheels 8, and collects the magnetic flux generated by the magnets 17 The torsion bar 21 is hooked to the output shafts 16 and 18 at both ends by pins 20 and twistable in accordance with the steering operation of the steering wheel 3.

Each of the output generating parts 13 and 14 is configured as a Hall IC (HIC) including a Hall element, an output circuit and the like. The Hall element is magnetically sensitive to the magnetic flux collected by a ring 22 through the yoke 19. The output circuit is configured to generate an electric output signal corresponding to the density of magnetic flux, which the Hall element sensed, and the supply voltage.

The Hall ICs 13 and 14 have, as shown in FIG. 3, respective output terminals 24 and 25 for outputting the respective electric output signals to the ECU 6. The Hall ICs 13 and 14 have a common input terminal 26 for receiving the supply voltage from a power supply source 12 and a common ground terminal 27 for grounding the torque sensor 5. Noise filtering-out capacitors 28 are connected between the Hall ICs 13, 14 and the terminals and electric wires are arranged to absorb electromagnetic wave which is disturbance.

In place of the common input terminal 26 for receiving the supply voltage from the electric power source 12 and the common ground terminal 27 for grounding, a terminal for receiving the supply voltage and a ground terminal may be provided in each of the Hall ICs 13 and 14.

In the torque sensor 5, when the torsion bar 21 is twisted by the steering operation of the steering wheel 3, the magnets 17 and the yoke 19 displace relatively. This displacement varies the magnetic density of the magnetic flux, which the Hall element senses. Thus, the electric output signals generated by the Hall ICs 13 and 14 are varied. As a result, the torque sensor 5 generates the electric output signals in accordance with the torque applied to the steering wheel 3.

Figure 4:
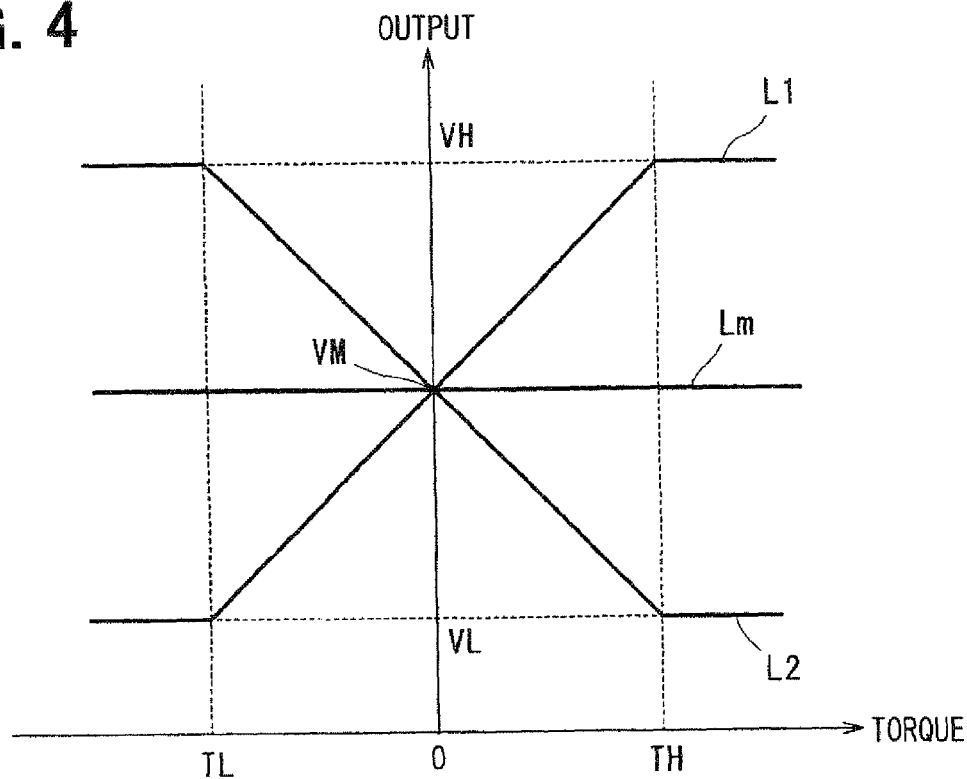
FIG. 4 is a graph showing an electric output signal of the torque sensor relative to a torque in the first embodiment.

The Hall ICs 13 and 14 are configured to generate the electric output signals in different magnitudes from each other relative to the same amount of twisting of the torsion bar 21, that is, relative to the same torque applied to the steering wheel 3. For example, the Hall ICs 13 and 14 are configured to generate respective electric output signals indicated by output characteristic lines L1 and L2 in FIG. 4, relative to the applied torque.

As indicated by the output characteristic lines L1 and L2, the electric output signals (voltages) are set to vary between an upper limit VH and a lower limit VL, and be line-symmetric with respect to a straight line Lm, which passes through an intermediate value VM between the upper limit VH and the lower limit VL. The straight line Lm is a line of correlation, which satisfies that the electric output signal equals the intermediate value VM, in the graph with the abscissa being the torque and the ordinate being the electric output signal. The torque is indicated as being positive and negative when the steering wheel 3 is turned in the clockwise direction and the counter-clockwise direction, respectively.

According to the output characteristic line L1, the electric output signal is fixed to the lower limit VL, when the torque varies in the negative region and its absolute value varies in the range greater than a negative threshold value TL. Further, the electric output signal is fixed to the upper limit VH, when the torque varies in the positive region and its absolute value varies in the range greater than a positive threshold value TH. The electric output signal varies along a positive linear line of correlation between a point (TL, VL) and a point (TH, VH) in the coordinate system, in which a coordinate point represents (torque, electric output signal), when the torque varies between the threshold values TL and TH.

According to the output characteristic line L2, on the other hand, the electric output signal is fixed to the higher limit VH, when the torque varies in the negative region and its absolute value varies in the range greater than the negative threshold value TL. Further, the electric output signal is fixed to the lower limit VL, when the torque varies in the positive region and its absolute value varies in the range greater than the positive threshold value TH. The electric output signal varies along a negative linear line of correlation between a point (TL, VH) and a point (TH, VL) in the coordinate system (torque, electric output signal), when the torque varies between the threshold values TL and TH. The output characteristic lines L1 and L2 are stored in the ECU 6, and used in a variety of control processing such as calculations of torque detection values and the like.

The ECU 6 is configured by a microcomputer 30, a drive circuit 31, noise filtering-out capacitors 29, pull-down resistors 32 and the like, which are mounted on a substrate (not shown). The microcomputer 30 performs an arithmetic operation and the like for controlling the operation of the electric motor 2 in response to the electric output signals inputted from the Hall ICs 13 and 14. The drive circuit 31 drives the electric motor 2 as commanded by the microcomputer 30. The pull-down resistors 32 stabilize the electric output signals received from the torque sensor 5. The microcomputer 30 is in the conventional configuration, which includes a CPU for performing control processing and arithmetic processing, memories such as a ROM and a RAM for storing various programs and various data, input devices and output devices. The data stored in the ROM includes data of the output characteristic lines L1 and L2.

The microcomputer 30 acquires a variety of detection values required to control the operation of the electric motor 2 and calculates, for example, a command value of current supplied to the electric motor 2 based on the electric output signals of the torque sensor 5 and other sensors. The microcomputer 30 further outputs a control signal applied to the drive circuit based on the calculated command value. As a result, the electric motor 2 is energized in accordance with the command value to assist the applied torque.

According to the first embodiment, the microcomputer 30 of the ECU 6 operates as failure checking means, which checks whether any one of the two Hall ICs 13 and 14 is in failure. For example, the microcomputer 30 normally repeats calculations of a sum SUMV of the electric output signals of the Hall ICs 13 and 14.

The microcomputer 30 determines that either one of the Hall ICs is in failure, if the calculated sum SUMV becomes greater than a higher limit value ($2VM+\alpha$) or less than a lower limit value ($2VM-\alpha$). The higher limit value may be predetermined to be a sum of two times of the intermediate value VM and a positive allowance range $+\alpha$. The lower limit value may be predetermined to be a sum of two times of the intermediate value VM and a negative allowance range $-\alpha$.

The ECU 6 further includes on the substrate an electric power supply circuit (PWR) 34, which varies the supply voltage supplied to the Hall ICs 13 and 14 under a command from the microcomputer 30. The electric power supply circuit 34 operates, together with the microcomputer 30, as a voltage varying part, which varies temporarily the supply voltage supplied to the torque sensor 5, when at least one of the Hall ICs 13 and 14 is in failure.

That is, when the microcomputer 30 determines that one of the Hall ICs 13 and 14 is in failure, it outputs a command signal for switching temporarily the supply voltage of the electric power supply circuit 34 from a high voltage (HI) to a low voltage (LO) for a predetermined time. The electric power supply circuit 34 temporarily switches the supply voltage from the high voltage to the low voltage thereby to lower the supply voltage supplied to the torque sensor 5 through the terminal 26.

The microcomputer 30 operates as a failing device specifying part, which specifies or identifies a failing Hall IC between the two Hall ICs 13 and 14 based on the variation in the electric output signals of the Hall ICs 13 and 14 when the supply voltage supplied to the torque sensor 5 is lowered by the electric power supply circuit 34. A Hall IC, which is not operating normally and specified as being in failure is referred to as a failing device. A Hall IC, which is not specified as being in failure, is referred to as a non-failing device.

It is assumed that the electric output signal of each of the Hall ICs 13 and 14 will vary in direct proportion to the variation in the supply voltage supplied from the electric power supply circuit 34. Based on this assumption, if the Hall IC 13 or 14 generates an electric output signal, which does not vary in response to the variation in the supply voltage supplied from the electric power supply circuit 34, such a Hall IC is specified to be the failing device.

If the failing device is specified, the microcomputer 30 checks whether the electric output signal of the non-failing device is between the upper limit VH and the lower limit VL, after the supply voltage supplied from the electric power supply circuit 34 is returned to the voltage normally supplied before the temporary variation. If the microcomputer 30 confirms that the electric output signal of the non-failing device remains between the upper limit VH and the lower limit VL, the microcomputer 30 continues to control the operation of the electric motor 2 in accordance with the electric output signal of the non-failing device.

When the supply voltage supplied to the torque sensor 5 is temporarily varied, the electric output signal of the non-failing device varies accordingly and does not correspond to the actual torque. In this instance, therefore, the microcomputer 30 corrects the electric output signal of the non-failing device to obviate the deviation caused by the temporary variation of the supply voltage supplied to the torque sensor 5. The microcomputer 30 thus controls the operation of the electric motor 2 based on the corrected electric output signal of the non-failing device, that is, not based on the electric output signal of the non-failing device caused to vary at the time of checking whether the Hall ICs 13 and 14 are normal. For example, if the electric output signal of the non-failing device is decreased temporarily by an amount $\Delta V$ of voltage at the time of the checking operation, the microcomputer 30 increases the same amount of voltage $\Delta V$ and calculates the command value of current for energizing the electric motor 2 based on the increased electric output signal.

Figure 5:
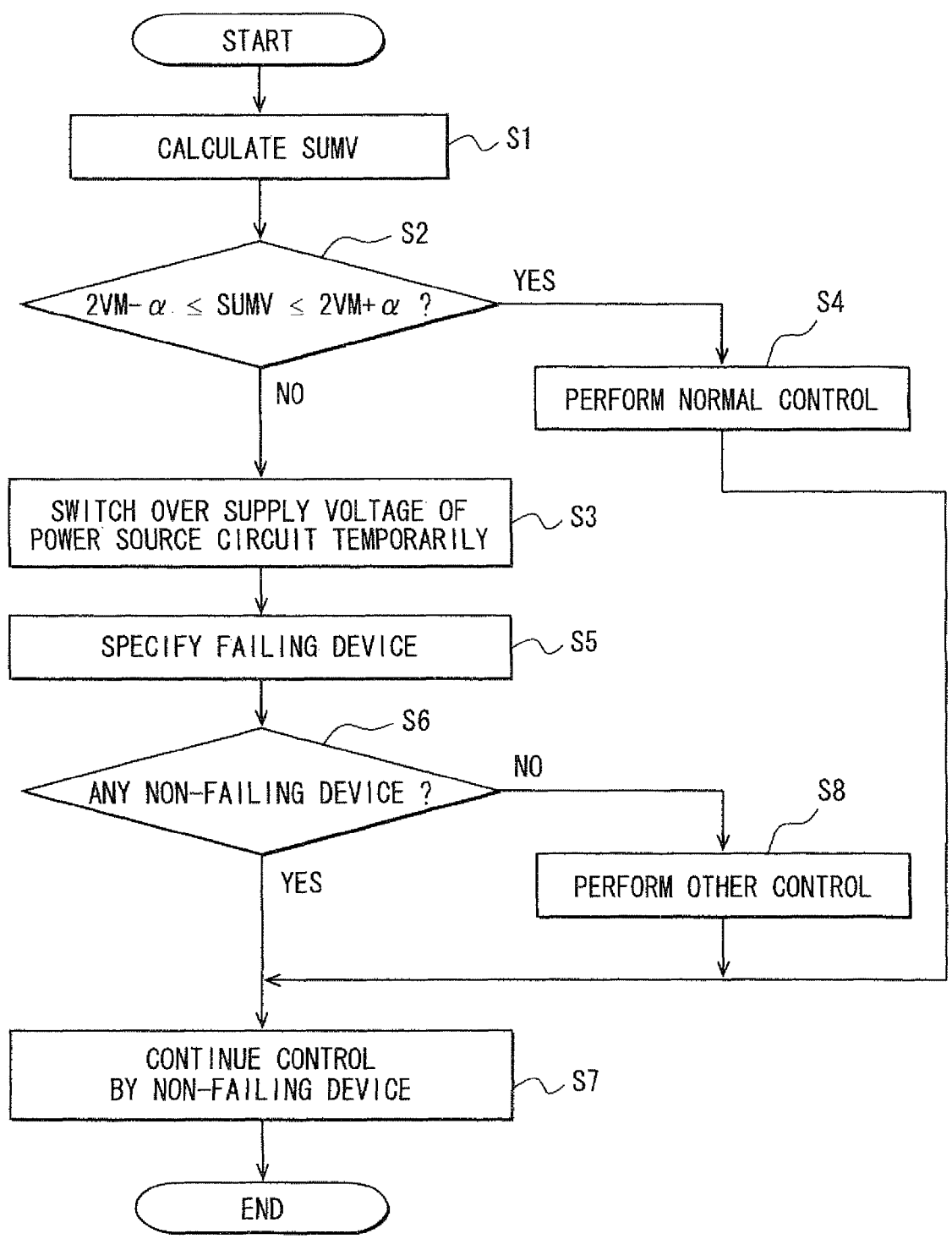
FIG. 5 is a flowchart of processing executed by the ECU in the first embodiment.

The control operation by the microcomputer 30 for the EPS 1 is further described with reference to a flowchart shown in FIG. 5.

At S1, the sum SUMV of the electric output signals of the Hall ICs 13 and 14 are calculated. At S2, it is checked whether the calculated sum SUMV is within a predetermined range, that is, between two limits $2VM+\alpha$ and $2VM-\alpha$. If the sum SUMV is not within the predetermined range (NO at S2), it is determined that at least one of the Hall ICs 13 and 14 is in failure (failing device).

In this case, at S3, a command signal is outputted to the electric power supply circuit 34 to switch the supply voltage from the high voltage (normal voltage) to the low voltage temporarily. The electric power supply circuit 34 responsively switches the supply voltage to the low voltage temporarily. If the sum SUMV is between the limits $2VM+\alpha$ and $2VM-\alpha$ (YES at S2), the electric motor 2 is controlled normally by performing normal control at S4.

Figure 6A:
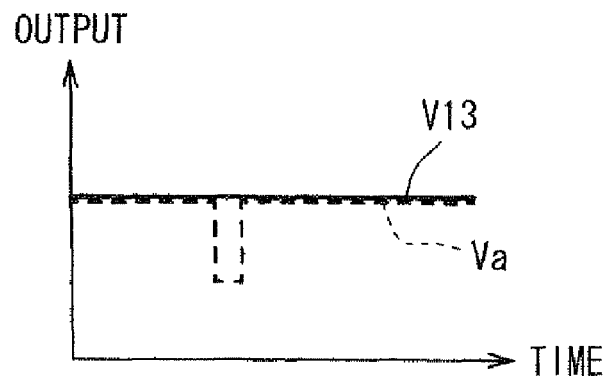
FIGS. 6A to 6C are time charts of electric output signal changes caused by the processing of FIG. 5 executed in the first embodiment.

Following S3, the failing device is specified. For example, if the electric output signal of the Hall IC 13 does not vary at all and remains unchanged as shown by a solid line V13 in FIG. 6A under a condition that it should vary as shown by an assumed voltage (dotted line Va) due to the temporary reduction of the supply voltage, the Hall IC 13 is specified as the failing device.

It is then checked at S6 whether there is any Hall IC 13 or 14 that is not in failure. If there remains the non-failing device (YES at S6), the electric motor 2 is continuously controlled based on the electric output signal of the non-failing device. If there is no non-failing device (NO at S6), that is, all the Hall ICs 13 and 14 are in failure, other control processing different from the normal control is performed at 58 so that the assisting power is gradually decreased.

Figure 6B:
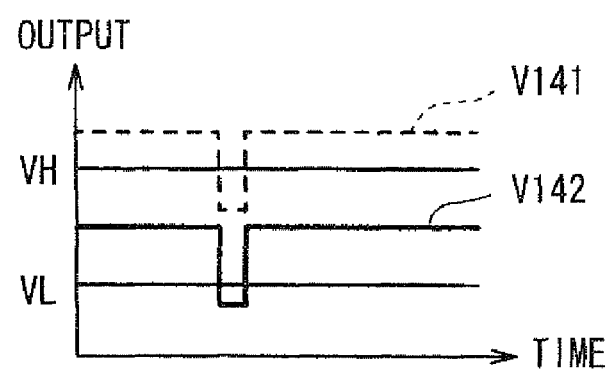

For example, as shown in FIG. 6B, even if the electric output signal V141 of the Hall IC 14 (non-failing device) temporarily decreases and then increases at the time of the temporary variation of the supply voltage, the Hall IC 14 is not determined as normal either if it is higher than the higher limit VH as indicated by a dotted line V141. In this instance, the Hall IC 14 is determined as having some failure and being not normal (NO at S6). As a result, the assisting power is gradually decreased in the other control different from the normal control of S4. If the electric output signal of the Hall IC 14 returns from the decreased voltage and remains between the two limits VH and VL as indicated by a solid line V142, the Hall IC 14 is determined as being normal and not in failure (YES at S6).

Figure 6C:
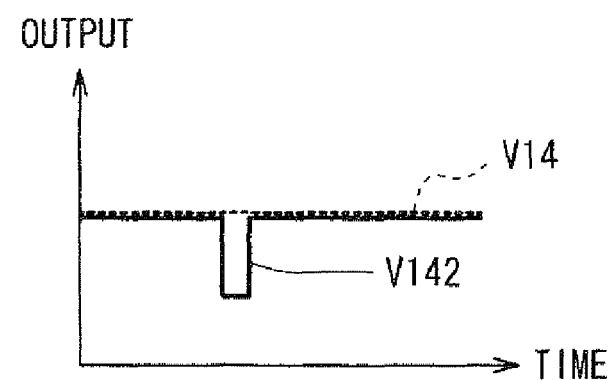

If there is any normal device (for example, Hall IC 14 having the electric output signal characteristic indicated by the solid line V142), the electric motor 2 is continuously controlled at 57 based on the electric output signal of the non-failing device. In this instance, the electric output signal of the non-failing device also decreases as shown by the solid lines V142 in FIGS. 6B and 6C. However, in normally controlling the electric motor 2 at S7 based on the electric output signal of the non-failing device (Hall IC 14), the electric output signal V142 is corrected to be free from variation as indicated by a dotted line V14 in FIG. 6B. That is, in calculating the command value for energizing the electric motor 2, the electric output signal V14 is assumed to have not varied at the time of temporary variation of the supply voltage supplied from the electric power supply circuit 14.

The EPS 1 of the first embodiment has the following advantages.

The ECU 6 controls the power-assisting operation of the electric motor 2 in accordance with the two electric output signals of the Hall ICs 13 and 14 of the torque sensor 5. The microcomputer 30 operates as the failure checking part for checking whether any one of the Hall ICs 13 and 14 is in failure. The microcomputer 30 and the electric power supply circuit 34 operate as the voltage varying part for varying temporarily the supply voltage supplied to the Hall ICs 13 and 14 when the Hall IC 13 or 14 is in failure and a failing device. The microcomputer 30 further operates as the failing device specifying part for specifying the failing device based on the variations of the electric output signals caused in response to the temporary variation of the supply voltage.

Thus, the failing device specifying part can specify the failing device by checking whether the electric output signal of each of the Hall ICs 13 and 14 varies in response to the temporary variation of the supply voltage. By continuing the control of the electric motor 2 based on the electric output signal of the non-failing device, the power-assisting operation can be maintained by the EPS 1 without reducing the assisting power.

It will rarely arise in the EPS 1 that mechanical structural parts break or fail. It will however arise possibly that the electric signal output system of the torque sensor 5 fails due to breakage of signal wires. By configuring the ECU 6 as described above in a case that two Hall ICs 13 and 14 are provided in the torque sensor 5, failure of the EPS 1 will be countered satisfactorily so that the power-assisting is continued without reducing the assisting power.

The ECU 6 stores the higher limit VH and the lower limit VH for the electric output signal, and checks whether the electric output signal of the non-failing device is deviating from the range between the higher limit VH and the lower limit VL by temporarily varying the supply voltage after specifying the failing device. If the check result indicates that the electric output signal of the non-failing electric output signal is within the range between the higher limit VH and the lower limit VL, the ECU 6 continues to control the operation of the electric motor 2 based on the electric output signal of only the non-failing device.

As a result, the reliability of the electric output signal after the failing device is specified. That is, even if it is determined by the failing device specifying part that the variation assumed to occur in the electric output signal of the non-failing device has arisen, the non-failing device is still suspected as having some other abnormality if its electric output signal produced before and after the temporary variation is outside the predetermined range between the higher limit VH and the lower limit VL. Therefore, the electric output signal of the non-failing device is not used to control the electric motor 2, if it deviates from the range of the higher limit VH and the lower limit VL. Thus, the reliability of the electric output signal, which is used for controlling the electric motor 2 can be enhanced.

The ECU 6 further corrects the electric output signal of the non-failing device not to include the temporary variation even if it actually includes the temporary variation caused by temporarily varying the supply voltage. The ECU 6 controls the electric motor 6 by using the corrected output signal of the non-failing device. Thus, the electric motor 2 is controlled in accordance with the actual torque applied to the steering wheel without being affected by the variation of the electric output signal caused by the temporary variation of the supply voltage.

Second Embodiment

An EPS 1 according to a second embodiment is different from that of the first embodiment in that a microcomputer 30 of an ECU 6 does not check whether any one of Hall ICs 13 and 14 is in failure. That is, the microcomputer 30 has no function of failure checking. Instead, as a voltage varying part, the microcomputer 30 and an electric power supply circuit 34 vary temporarily a supply voltage to a torque sensor 5 periodically whether there is a failing device or not, that is, even if both Hall ICs 13 and 14 are not in failure. Further, the microcomputer 30 checks, as a failing device specifying part, whether any one of the Hall ICs 13 and 14 is in failure based on transition of electric output signals of the Hall ICs 13 and 14, each time the supply voltage is varied temporarily. Thus, the failing device can be specified readily and speedily.

It is also possible to check the Hall ICs 13 and 14 by temporarily varying the supply voltage before a steering operation is started for travel.

Other Embodiments

An EPS 1 according to a further embodiment may have three or more Hall ICs in a torque sensor 5. In this case, if there are two or more non-failing devices, one non-failing device, the electric output signal of which remains between two limits VH and VL, may be selected, so that an electric motor 2 is continued to be controlled based on the electric output signal of the selected non-failing device.

A torque sensor 5 may be other than a magnetic type sensor.

The present invention is not limited to the above-disclosed embodiments but may be implemented in many other ways.

What is claimed is:

1. An electric power steering system comprising:
an electric motor that generates output power for assisting steering operation of a steering wheel;
a torque sensor for generating electric output signals corresponding to toque applied to the steering wheel; and
a control unit for controlling an operation of the electric motor in accordance with the electric output signals of the torque sensor,
wherein the torque sensor includes a magnetic flux generating part and a plurality of output generating parts, the magnetic flux generating part generating magnetic flux varying with a steering operation of the steering wheel, and the plurality of output generating parts generating the electric output signals in accordance with the magnetic flux generated by the magnetic flux generating part and a supply voltage supplied from a predetermined electric power supply circuit, and
wherein the control unit includes a failure checking part, a voltage varying part and a failing device specifying part, the failure checking part checking whether any one of the plurality of output generating parts has a failure, the voltage varying part temporarily varying the supply voltage if the failure in any one of the output generating parts is determined, and the failing device specifying part specifying failing one of the plurality of output generating parts as a failing device by determining, when the supply voltage is temporarily varied, that the output generating part is normal and is in failure when the electric output signal thereof varies and does not vary temporarily in correspondence to temporary variation of the supply voltage, respectively.

2. The electric power steering system according to claim 1, wherein:
the control unit has a higher limit value and a lower limit value for the electric output signals;
the control unit selects, when the failing device is specified, a non-failing device, which has no failure and maintains the electric output signal thereof between the higher limit value and the lower limit value when the supply voltage is temporarily varied; and the control unit continues control of the electric motor based on the electric output signal of the selected non-failing device.

3. The electric power steering system according claim 1, wherein:
the control unit corrects the electric output signal, which is temporarily varied when the supply voltage is temporarily varied, so that the electric output signal has no variation, and controls the electric motor by a corrected electric output signal.

4. The electric power steering system according claim 2, wherein:
the control unit corrects the electric output signal, which is temporarily varied when the supply voltage is temporarily varied, so that the electric output signal has no variation, and controls the electric motor by a corrected electric output signal.

5. An electric power steering system comprising:
an electric motor that generates output power for assisting steering operation of a steering wheel;
a torque sensor for generating electric output signals corresponding to toque applied to the steering wheel; and
a control unit for controlling an operation of the electric motor in accordance with the electric output signals of the torque sensor,
wherein the torque sensor includes a magnetic flux generating part and a plurality of output generating parts, the magnetic flux generating part generating magnetic flux varying with a steering operation of the steering wheel, and the plurality of output generating parts generating the electric output signals in accordance with the magnetic flux generated by the magnetic flux generating part and a supply voltage supplied from a predetermined electric power supply circuit, and
wherein the control unit includes a voltage varying part and a failing device specifying part, the voltage varying part temporarily varying the supply voltage, and the failing device specifying part specifying failing one of the plurality of output generating parts as a failing device by determining, when the supply voltage is temporarily varied, that the output generating part is normal and is in failure when the electric output signal thereof varies and does not vary temporarily in correspondence to temporary variation of the supply voltage, respectively.

6. The electric power steering system according claim 5, wherein:
the control unit corrects the electric output signal, which is temporarily varied when the supply voltage is temporarily varied, so that the electric output signal has no variation, and controls the electric motor by a corrected electric output signal.

7. The electric power steering system according to claim 5, wherein:
the control unit has a higher limit value and a lower limit value for the electric output signals;
the control unit selects, when the failing device is specified, a non-failing device, which has no failure and maintains the electric output signal thereof between the higher limit value and the lower limit value when the supply voltage is temporarily varied; and
the control unit continues control of the electric motor based on the electric output signal of the selected non-failing device.

8. The electric power steering system according claim 7, wherein:
the control unit corrects the electric output signal, which is temporarily varied when the supply voltage is temporarily varied, so that the electric output signal has no variation, and controls the electric motor by a corrected electric output signal.

* * * * *